UNIDIRECTIONAL AMPLIFIER CONSISTING OF CONCATENATED BIDIRECTIONAL NEGATIVE RESISTANCE AMPLIFIERS WHICH ARE COUPLED BY DELAY NETWORKS AND ENERGIZED SEQUENTIALLY

Filed Oct. 17, 1961

4 Sheets-Sheet 1

UNIDIRECTIONAL AMPLIFIER CONSISTING OF CONCATENATED BIDIRECTIONAL NEGATIVE RESISTANCE AMPLIFIERS WHICH ARE COUPLED BY DELAY NETWORKS AND ENERGIZED SEQUENTIALLY

Filed Oct. 17, 1961

UNIDIRECTIONAL AMPLIFIER CONSISTING OF CONCATENATED BIDIRECTIONAL NEGATIVE RESISTANCE AMPLIFIERS WHICH ARE COUPLED BY DELAY NETWORKS AND ENERGIZED SEQUENTIALLY

Filed Oct. 17, 1961

July 14, 1964 SHINTARO OSHIMA ETAL 3,141,138

UNIDIRECTIONAL AMPLIFIER CONSISTING OF CONCATENATED BIDIRECTIONAL NEGATIVE RESISTANCE AMPLIFIERS WHICH ARE COUPLED BY DELAY NETWORKS AND ENERGIZED SEQUENTIALLY

Filed Oct. 17, 1961

4 Sheets-Sheet 4

United States Patent Office 3,141,138

Patented July 14, 1964

3,141,138

UNIDIRECTIONAL AMPLIFIER CONSISTING OF CONCATENATED BIDIRECTIONAL NEGATIVE RESISTANCE AMPLIFIERS WHICH ARE COUPLED BY DELAY NETWORKS AND ENERGIZED SEQUENTIALLY

Shintaro Oshima, Musashino-shi, Hajime Enomoto, Ichikawa-shi, and Kitsutaro Amano, Tokyo-to, Japan, assignors to Kokusai Denshin Denwa Kabushiki Kaisha, Tokyo-to, Japan, a joint-stock company of Japan Filed Oct. 17, 1961, Ser. No. 145,617

Claims priority, application Japan Oct. 24, 1960

5 Claims. (Cl. 330—61)

This invention relates to amplifiers wherein negative-resistance circuits are used and more particularly to a new and improved, unidirectional, repeater amplifier.

It is known that an amplifier can be composed by utilizing a negative resistance. This method can be applied to the case of a repeater amplifier which is used to compensate the loss of a transmission line. The present invention relates to a repeater amplifier wherein, by connecting in cascade amplifiers in which are used negative resistances which, being two-terminal networks, are originally bidirectional, and imparting thereto an activation power of a specific frequency, a unidirectional characteristic is provided. Since the amplifier according to the present invention can be composed of elements which do not contain vacuum tubes, such as negative-resistance circuits, a power source for activating the said circuits, delay circuits, it has high reliability and is advantageously adaptable for use as a repeater amplifier for such systems as land cables and as a repeater for submarine cables.

The nature and details of the invention will be more clearly apparent by reference to following description taken in conjunction with the accompanying drawings in which the same and equivalent parts are designated by the same reference characters, and in which.

Figure 2:
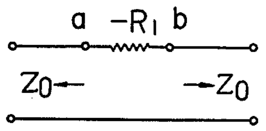
FIG. 2 is an electrical circuit diagram for describing the principle of the present invention, showing the case wherein a negative-resistance element of current-controlled type is used.
Figure 4:
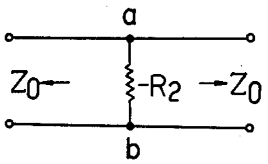
FIG. 4 is an electrical circuit diagram for describing the principle of the present invention, showing the case wherein a negative-resistance element of voltage-controlled type is used.
Figure 5A:
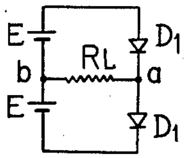
Figure 5B:
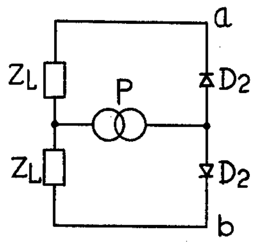
Figure 5C:
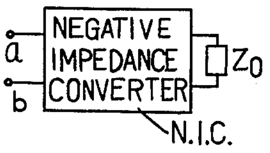
Figure 6A:
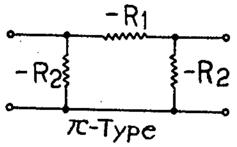
Figure 6C:
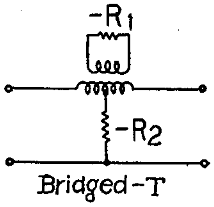
Figure 6B:
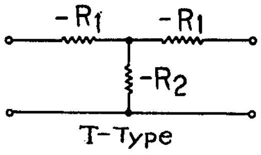
Figure 6D:
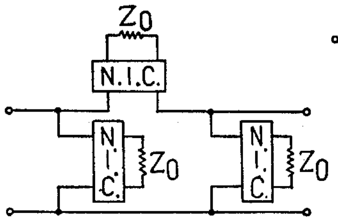
Figures 6E, 6F, 7A, 7B:
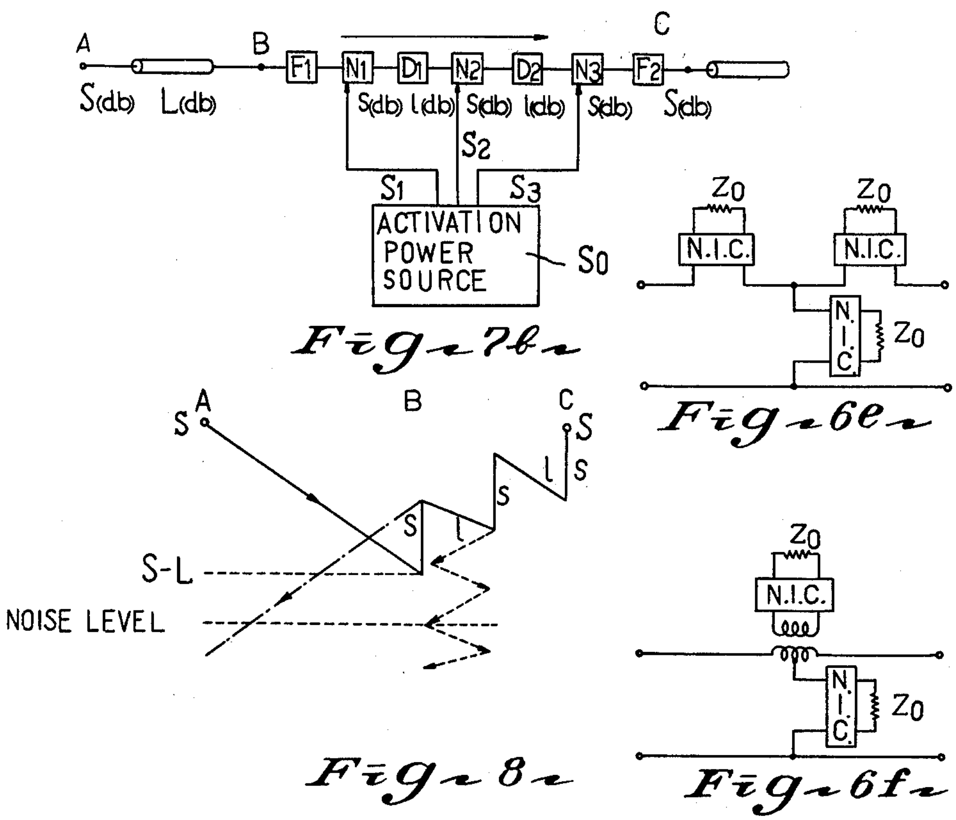
Figure 8:
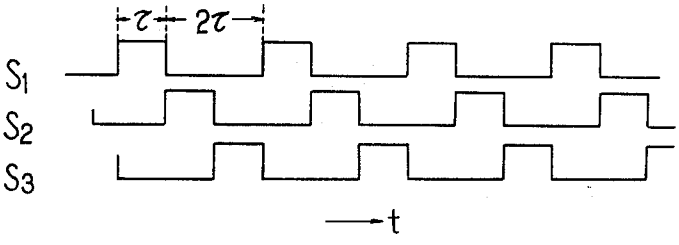
Figure 9:
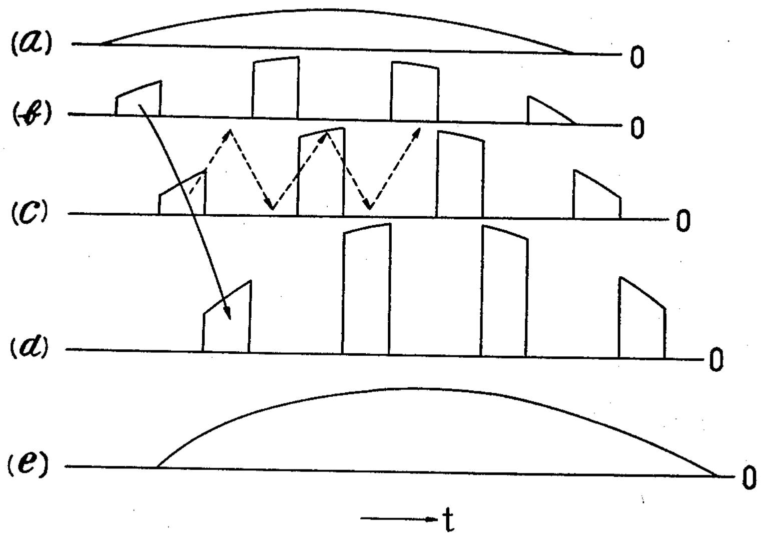
Figure 10A:
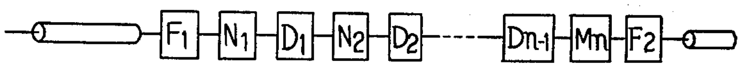
Figure 10B:
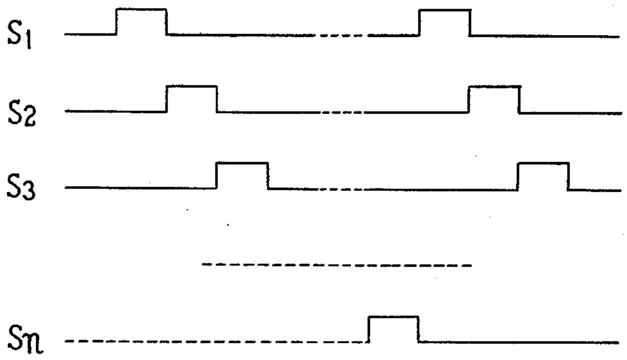
Figure 11A:
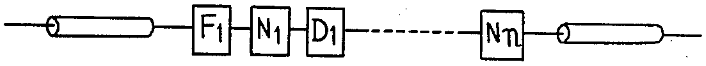
Figure 11B:
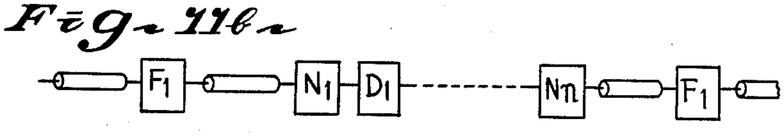
Figure 12A:
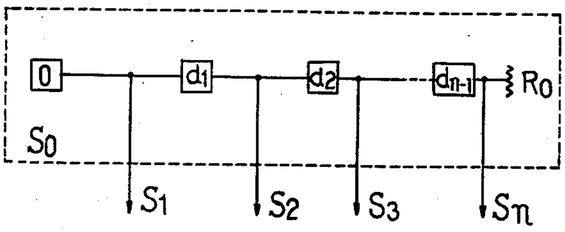
Figure 12B:
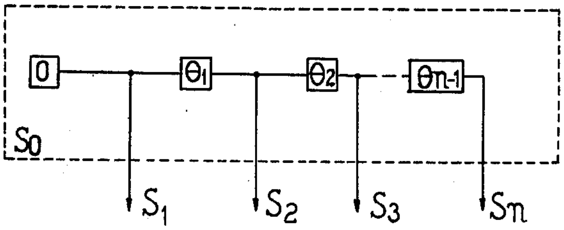

FIG. 5*a* is a circuit diagram showing one example of a negative-resistance circuit suitable for the present invention in the case wherein negative-resistance elements as shown in FIG. 4 and constant-voltage power sources are connected in a bridge arrangement;

FIG. 5*b* is a circuit diagram showing one example of a negative-resistance circuit to be used in the present invention in the case wherein the negative-resistance element shown in FIG. 2 and load impedances are connected in a bridge arrangement;

FIG. 5*c* is a circuit diagram showing one example of a negative-resistance circuit to be used in the present invention in the case where a negative-impedance converter is used;

FIGS. 6*a*, 6*b*, and 6*c* are circuit diagrams showing negative-resistance circuits to be used in the present invention in the case wherein the circuit elements shown in FIGS. 2, 4, 5*a* and 5*b* are combined to form, respectively, a $\pi$-type, T-type, and bridged-T-type connections;

FIGS. 6*d*, 6*e* and 6*f* are circuit diagrams showing negative-resistance circuits to be used in the present invention in the case where the circuit elements shown in FIG. 5*c* are combined to form, respectively, a $\pi$-type, T-type, and bridged-T-type connections;

FIG. 7*a* is a schematic block diagram showing one embodiment of the unidirectional amplifier according to the invention;

FIG. 7*b* is a signal level diagram indicating the operation of the embodiment shown in FIG. 7*a*;

FIG. 8 is a wave-form diagram indicating the period and phase relations of activation powers and describing the principle of the invention;

FIGS. 9*a*, *b*, *c*, *d* and *e* are wave-form diagrams for describing the operation of the amplifier of the invention;

FIG. 10*a* is a schematic block diagram indicating another embodiment of the invention;

FIG. 10*b* is a wave-form diagram showing the wave forms of the activation powers of respective negative-resistance circuits;

FIGS. 11*a* and 11*b* are circuit-composition diagrams indicating still other embodiments of the amplifier according to the invention;

FIG. 12*a* is a block diagram showing an activation power source wherein delay circuits are used; and FIG. 12*b* is a block diagram showing an activation power source wherein phase-shifting circuits are used.

To facilitate a full understanding of the nature of the present invention, a description of a negative-resistance circuit, which has a most important function in the present invention, is presented below.

Figure 1:
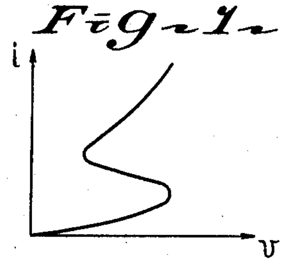
FIGURE 1 is a graphical representation showing the characteristic curve of a negative-resistance element of current controlled type, wherein current and voltage are, respectively, shown by letters $i$ and V.
Figure 3:
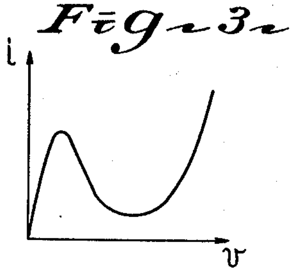
FIG. 3 is a graphical representation showing the characteristic curve of a negative-resistance element of voltage-controlled type, wherein current and voltage are, respectively, shown by letters $i$ and V.

It is known that in the case of an element (for example: a positive-gap diode) having a negative resistance of the current-controlled type such as that whose characteristic curve is shown in FIG. 1, if this negative resistance ($-R_1$) is connected in series in a transmission line as shown in FIG. 2, and one half of the line impedance $Z_0$ is caused to be greater than ($-R_1$), a negative-resistance circuit having stable amplification will be obtained. In this case, a double-base diode can be also used as a negative resistance of the current-controlled type. That is, when a direct-current voltage is applied across the first base electrode so that the plus side of the D.C. voltage is impressed on the second base electrode the terminal resistance between the first base electrode and emitter of the double-base diode assumes a negative resistance characteristic. This negative resistance can be utilized as well as the negative resistance of the above case. It is also known that in the case of a negative resistance of voltage-controlled type (for example: Esaki diode) such as that whose characteristic curve is shown in FIG. 3, if this negative resistance ($-R_2$) is inserted in parallel in a transmission line as shown in FIG. 4, and one half of the line impedance $Z_0$ is caused to be less than ($-R_2$), a negative-resistance circuit having stable amplification action will be obtained. In order to make the negative resistance element assume its negative resistance characteristic, it is necessary that a suitable exciting signal is impressed on the element. In this case, if a unidirectional amplification is to be prepared, a so-called multiple phase excitation wherein a plurality of periodic excitation signals are used is needed. However, since the frequency component of the periodic exciting signals appears in the load in the case of these circuits, it is undesirable that a negative resistance circuit as will be described hereinafter is composed of only these negative resistance elements. However, since activation power appears in the load, this circuit cannot be used particularly in such a case as will be described hereinafter wherein a periodic activation power is used.

Accordingly, such circuits as are shown in FIGS. 5*a*,

5*b*, and 5*c* are used in the present invention in order to perform the excitation by periodic exciting signals. That is, if in a diode-pair circuit wherein two voltage-controlled type negative-resistances ($-R_2$ shown in FIG. 4) are connected in series as shown in FIG. 5*a*, the load impedance comprising the load resistance $R_L$ and the characteristic impedance $Z_0$ of a transmission line to be connected is caused to be less than the negative resistance values of the diodes, the impedance viewed from the terminals "*a*" and "*b*" will, within a suitable voltage range, be a stable, voltage-controlled type, negative resistance. Since two diodes and constant-voltage power sources E are connected in bridge arrangement in this circuit, the circuit has the unique feature in that the activation power does not appear between the output terminals "*a*" and "*b*." These terminals correspond to, for example, the terminals "*a*" and "*b*" in FIG. 4 and are employed as the input terminals and the output terminals.

Referring now to FIG. 5*b*, by connecting current-controlled type negative-resistance elements ($-R_1$) and load impedances $Z_L$ in a bridge arrangement and connecting a constant-current power source P as shown, with the connection points consisting of a connection point between the current-controlled type negative resistance elements ($-R$) and the connection point between the load impedances $Z_L$, a circuit having characteristics equivalent to those of a current-controlled type negative-resistance is formed.

It is well known that negative impedance converter (N.I.C.) can be constructed as shown in FIG. 5*c* by utilizing vacuum tubes or transistors wherein the impedances viewed from the terminals "*a*" and "*b*" are made to assume a negative impedance characteristic. In this case, a circuit having a negative resistance characteristic of voltage-controlled type and a circuit having a negative resistance characteristic of current controlled type can be, respectively, inserted between the corresponding terminals "*a*" and "*b*" in FIG. 4 and in FIG. 2. In FIG. 5*c*, $Z_0$ designates an impedance which is to be converted.

In each of the above-described negative-resistance circuits, only one type of negative-resistance element or circuit either of the current-controlled type or the voltage-controlled type, is used. However, both said types can be used together in various combinations such as that of $\pi$-type, T-type, or bridged-T-type, as shown in FIGS. 6*a*, 6*b*, 6*c*, 6*d*, 6*e* and 6*f*, where ($-R_1$), ($-R_2$), $Z_0$, and N.I.C. designate, respectively, a current-controlled type negative resistance, and a voltage-controlled type negative-resistance, an impedance to be converted, and a negative-impedance converter either of an open-circuit stable type or of a short-circuit stable type.

However, since these negative-resistance circuits, in contrast to such elements as vacuum tubes and transistors, are two terminal elements, an amplifier wherein these negative resistance circuits are used in the states of continuous excitation does not possess unidirectional characteristic but becomes a bidirectional amplifier. If these are connected in cascade they will cause oscillation. Therefore, some solution to this problem must be devised.

It is an object of the present invention to provide a new repeater amplifier wherein a polyphase excitation method which is generally used in a logical circuit to provide unidirectional characteristic is employed for obtaining a unidirectional characteristic.

Referring to FIG. 7*a*, the interval (A . . . C) represents one section of a transmission circuit, the interval (A . . . B) being the transmission line, whose loss is denoted by L(db). The interval (B . . . C) represents a repeater amplifier for the purpose of compensating for said loss and comprises low-pass filters $F_1$ and $F_2$; negative-resistance circuits $N_1$, $N_2$, and $N_3$, each of which has a gain *s*; and delay circuits $D_1$ and $D_2$ which have a delay time $\tau$, and each of which has a loss denoted by L(db).

The circuits $N_1$, $N_2$, and $N_3$ are supplied with activation powers $S_1$, $S_2$ and $S_3$, respectively, from an activation power source $S_0$.

The negative-resistance circuits $N_1$, $N_2$, and $N_3$ are so adapted that when such a three-phase excitation voltage as indicated in FIG. 8 is impressed thereon, each of these circuits enters its negative-resistance region and has amplification action only during the time $\tau$ when excitation voltage is applied, and that, since each circuit does not enter its negative-resistance region during the time $2\tau$ when excitation voltage is not applied, it does not possess amplification action. If, as a supposition, a signal $S-L$ (db) as indicated in FIG. 9*a* has entered as an input signal. The input, after passing through the wave filter $F_1$, will be subjected to sampling amplification by the amplifier $N_1$, and an output such as that indicated in FIG. 9*b* will be obtained. After being delayed by $\tau$ through the delay circuit $D_1$, the said output reaches the negative-resistance circuit $N_2$. However, since an excitation voltage is applied in synchronism with the said signal on the circuit $N_2$, this signal is amplified again, and an output such as that indicated in FIG. 9*c* is obtained. The output of the circuit $N_2$ passes through the delay circuit $D_2$ and reaches the circuit $N_3$ by which it is amplified in exactly the same manner as described above. The output of the circuit $N_3$ is represented by FIG. 9*d*, which upon passing through the wave filter $F_2$ becomes a signal represented by FIG. 9*e*.

On the other hand, since the amplification action of the negative-resistance circuit $N_1$ is not unidirectional, a signal amplified by the circuit $N_1$ passes through the wave filter $F_1$ and is sent in the reverse direction through the transmission line. In this case, if the loss L in the transmission line is sufficiently greater than the gain *s* of the circuit $N_1$, this reflected signal, upon reaching the point A is amply attenuated as indicated by the broken or intermittent line of the level diagram shown in FIG. 7*b*, and its level becomes $(S+s-2L)$ db and can be caused to be below the noise level. Accordingly, its influence can be neglected. The manner in which the output of the circuit $N_2$ passes through the delay circuit $D_2$ and reaches the circuit $N_3$ where it is amplified has been already described, but it is also sent simultaneously in the reverse direction to the circuit $N_1$. However, as is apparent from the time chart shown in FIG. 9, at the time when the signal from the circuit $N_2$ reaches the circuit $N_1$, an excitation voltage is not being impressed on the circuit $N_1$. Accordingly the signal is not amplified but, after being attenuated somewhat, it is reflected. After this reflection has been repeated four times as indicated by the dotted line shown in FIG. 9*c*, the signal reaches the circuit $N_1$ which is in an excited state. The level at this time is also below the noise level as indicated in FIG. 7*b*. Accordingly, by causing the delay circuit to contain some loss, or by terminating the delay circuit with its characteristic impedance, it is possible to cause the influence of the reflected wave to be amply small and to prevent oscillation.

The case of three-stage amplification is shown in FIGS. 7*a* to 9, but when the number of stages is two or more, unidirectional amplification is possible in exactly the same manner. Furthermore, while the foregoing description is related to the case of three-phase excitation, the number of phases may be increased above three to obtain polyphase excitation. As indicated in FIG. 10, as the number of phases of excitation is increased, it becomes possible to cause the transmission loss in the reverse direction to be amply large. The output from the negative-resistance circuit of the final stage is sent out into the transmission line after passing through the wave filter $F_2$. It is necessary that the signal level at this time be equal to the level at the point A. Accordingly, it is necessary to determine *s* or *l* so as to satisfy the condition expressed by $$S=S-L+3s-2l$$

that is, $3s=L+2l$, in the case of three-stage amplification, and $ns=L+(n-1)l$ in the general case of $n$=stage amplification.

Moreover, in the case of this embodiment of the invention, only one of the wave filters, either $F_1$ or $F_2$, may be used as indicated in FIG. 11*a*, and it is possible to attain the purpose of the invention by placing one wave filter in any position in the transmission line as indicated in FIG. 11*b*.

Examples of activation power sources suitable for use with the amplifier of this invention are illustrated in FIGS. 12*a* and 12*b*. By utilizing delay circuits as shown in FIG. 12*a*, it is possible to obtain excitation voltage to be supplied to each of the amplifiers. In this case, delay circuits designated by $d_1, d_2, \ldots d_{n-1}$ which have equal delay time are used. Activation power is generated by an activation power generator O, and a terminal resistance $R_0$ is connected as shown. It is also possible to obtain activation power in the same manner as described above by using phase shifters as indicated by $\theta_1, \theta_2, \ldots \theta_{n-1}$ shown in FIG. 12*b*.

Since it is obvious that many changes and modifications can be made in the above-described details without departing from the nature and spirit of the invention, it is to be understood that the invention is not to be limited to the details described herein except as set forth in the appended claims.

What is claimed is:

1. A unidirectional amplifier comprising, amplification means comprising negative resistance circuits and delay circuits having the same delay time, means connecting said circuits alternately in cascade, each of said negative resistance circuits having a negative resistance characteristic and capable of amplifying an input signal only when each of said negative resistance circuits is excited by an exciting periodic power signal having a duration equal to the delay time of said delay circuits and a delay between periods equal to an integral multiple of the delay time of said delay circuits, said negative resistance circuits comprising means attenuating an input signal during said delay between periods of said exciting signal, an exciting power source means connected for applying a plurality of said exciting periodic power signals which have the same duration and the same delay between periods respectively and have a phase difference equal to the delay time of said delay circuits successively, said signals equaling in number a number which is equal to the number of said negative resistance circuits, whereby a signal travelling in an amplification direction is amplified each time when the travelling signal passes through said negative resistance circuits, and another signal travelling in an opposite direction to said amplification direction is attenuated each time when the other signal has passed through each of said negative resistance circuits.

2. A unidirectional amplifier comprising; amplification means comprising two negative resistance circuits and delay circuits having a delay time wherein said two negative resistance circuits are connected alternately in cascade, each of said negative resistance circuits having a negative resistance characteristic and amplifying an input signal thereof only when each of said negative resistance circuits is excited by an exciting periodic power signal having a duration equal to the delay time of said delay circuits and a delay between periods equal to an integral multiple of the delay time of said delay circuits, said negative resistance circuits comprising means for attenuating an input signal during said delay between periods of said exciting signal; filter means comprising at least one filter circuit connected with said amplification means in cascade having a characteristic capable of cutting-off the frequency component of said exciting periodic signal and capable of passing therethrough the frequency component of the input signal thereof, and an exciting power source means connected for applying a plurality of said exciting periodic signals which have the same duration and the same delay between periods respectively and have a phase difference equal to the delay time of said delay circuits successively and the number of which is equal to the number of said negative resistance circuits, whereby a signal travelling in an amplification direction is amplified each time when the signal being amplified passes through each of said negative resistance circuits, and a signal travelling in the direction opposite to said amplification direction is attenuated each time when the last-mentioned signal passes through each of said negative resistance circuits.

3. An amplifier as set forth in claim 2, in which each of said negative resistance circuits comprises at least one voltage-controlled type negative resistance element.

4. An amplifier as set forth in claim 2, in which each of said negative resistance circuits comprises at least one current-controlled type negative resistance element.

5. An amplifier as set forth in claim 2, in which each of said negative resistance circuits comprises at least one negative-impedance converter.

References Cited in the file of this patent

UNITED STATES PATENTS

| | | |
|---|---|---|
| 2,522,402 | Robertson | Sept. 12, 1950 |
| 2,543,028 | Kammer | Feb. 27, 1951 |
| 2,585,571 | Mohr | Feb. 12, 1952 |
| 2,817,822 | Meyers | Dec. 24, 1957 |
| 2,852,751 | Lundry | Sept. 16, 1958 |
| 2,933,703 | Kinariwala | Apr. 19, 1960 |
| 2,968,773 | Sandberg | Jan. 17, 1961 |
| 3,001,157 | Sipress | Sept. 19, 1961 |
| 3,103,600 | Lewin | Sept. 10, 1963 |